United States Patent
Yamanaka et al.

(10) Patent No.: US 11,360,035 B2
(45) Date of Patent: Jun. 14, 2022

(54) METHOD FOR MEASURING FIBER ORIENTATION DEGREE, FIBER ORIENTATION DEGREE MEASUREMENT APPARATUS, AND CONTROL COMPUTER PROGRAM FOR FIBER ORIENTATION DEGREE MEASUREMENT APPARATUS

(71) Applicants: NATIONAL UNIVERSITY CORPORATION TOKAI NATIONAL HIGHER EDUCATION AND RESEARCH SYSTEM, Nagoya (JP); TORAY INDUSTRIES, INC., Tokyo (JP); KYOWA INDUSTRIAL CO., LTD., Sanjo (JP)

(72) Inventors: Atsuhiko Yamanaka, Aichi (JP); Mariko Terada, Aichi (JP); Yukitane Kimoto, Aichi (JP); Koji Shiraki, Shizuoka (JP); Yuji Hotta, Aichi (JP); Daisuke Shimamoto, Aichi (JP)

(73) Assignees: NATIONAL UNIVERSITY CORPORATION TOKAI NATIONAL HIGHER EDUCATION AND RESEARCH SYSTEM, Nagoya (JP); TORAY INDUSTRIES, INC., Tokyo (JP); KYOWA INDUSTRIAL CO., LTD., Sanjo (JP)

( * ) Notice: Subject to any disclaimer, the term of this patent is extended or adjusted under 35 U.S.C. 154(b) by 148 days.

(21) Appl. No.: 16/652,906

(22) PCT Filed: Oct. 2, 2018

(86) PCT No.: PCT/JP2018/036953
§ 371 (c)(1),
(2) Date: Apr. 1, 2020

(87) PCT Pub. No.: WO2019/069956
PCT Pub. Date: Apr. 11, 2019

(65) Prior Publication Data
US 2020/0300788 A1   Sep. 24, 2020

(30) Foreign Application Priority Data
Oct. 3, 2017   (JP) .............................. JP2017-193769

(51) Int. Cl.
*G01N 23/207*   (2018.01)
*G01N 23/2055*   (2018.01)

(52) U.S. Cl.
CPC ....... *G01N 23/207* (2013.01); *G01N 23/2055* (2013.01); *G01N 2223/0566* (2013.01); *G01N 2223/306* (2013.01)

(58) Field of Classification Search
CPC ..... G01N 2223/0566; G01N 2223/306; G01N 23/2055; G01N 23/207
See application file for complete search history.

(56) References Cited

U.S. PATENT DOCUMENTS 6,141,480 A  *  10/2000  Simon ..................... G01L 1/242
                                                        385/12
RE48,612 E  *  6/2021  Yun ......................... H01J 35/08
(Continued)

FOREIGN PATENT DOCUMENTS

CN     201352204 Y     11/2009
JP     9-89816 A       4/1997
(Continued)

OTHER PUBLICATIONS

English translation of JP2016090259 (Year: 2016).*
(Continued)

*Primary Examiner* — Dani Fox
*Assistant Examiner* — Soorena Kefayati
(74) *Attorney, Agent, or Firm* — Birch, Stewart, Kolasch & Birch, LLP

(57) ABSTRACT

A method for measuring a fiber orientation degree includes: irradiating a sample formed of a composite material con-
(Continued)

taining discontinuous carbon fibers with an X-ray to acquire an X-ray diffraction image; calculating an angle $(2\theta)_A$ of a peak originating from a crystal face of graphite; calculating a correction coefficient $\delta$ of a thickness of the sample; calculating an upper limit $(2\theta)_B$ of the peak of the crystal face of graphite; calculating a diffraction sensitivity $I_C(\phi)$ of the peak originating from the crystal face of graphite by correcting an integrating range with the correction coefficient $\delta$ and integrating the X-ray diffraction image with respect to a diffraction angle $(2\theta)$; and calculating a fiber orientation degree $Sd(\beta)$ by the method of Hermans from the diffraction sensitivity $I_C(\phi)$.

6 Claims, 9 Drawing Sheets

(56) References Cited

U.S. PATENT DOCUMENTS

| | | | | |
|---|---|---|---|---|
| 2004/0177700 | A1* | 9/2004 | Yokoyama | G01N 23/207 |
| | | | | 257/E21.272 |
| 2012/0025073 | A1* | 2/2012 | Kumar | H01J 37/22 |
| | | | | 250/307 |
| 2015/0146960 | A1* | 5/2015 | Sakumura | G01N 23/207 |
| | | | | 382/132 |
| 2015/0231835 | A1* | 8/2015 | Pridie | B29C 51/10 |
| | | | | 425/169 |
| 2016/0247271 | A1* | 8/2016 | Hishida | G06V 10/44 |
| 2016/0349193 | A1* | 12/2016 | Günter | G01N 23/046 |
| 2017/0336336 | A1* | 11/2017 | Tanaka | H01J 37/28 |
| 2019/0011254 | A1* | 1/2019 | Nielsen | B29C 70/54 |
| 2019/0025231 | A1* | 1/2019 | Jakubek | G01N 23/083 |
| 2019/0072502 | A1* | 3/2019 | Sano | A61B 6/4291 |
| 2019/0094158 | A1* | 3/2019 | Sunder | G01N 23/207 |
| 2019/0094160 | A1* | 3/2019 | Sunder | G01N 23/20016 |
| 2019/0204245 | A1* | 7/2019 | Otsuka | H01J 37/28 |
| 2019/0310208 | A1* | 10/2019 | Sharma | G01N 23/201 |
| 2019/0317026 | A1* | 10/2019 | Hu | G01N 27/221 |
| 2021/0080410 | A1* | 3/2021 | Vukotic | B32B 27/281 |
| 2021/0282728 | A1* | 9/2021 | Vija | A61B 6/483 |

FOREIGN PATENT DOCUMENTS

| | | | |
|---|---|---|---|
| JP | 2016-90259 A | | 5/2016 |
| JP | 2016090259 A | * | 5/2016 |

OTHER PUBLICATIONS

International Search Report, issued in PCT/JP2018/036953, dated Dec. 25, 2018.

Written Opinion of the International Searching Authority, issued in PCT/JP2018/036953, dated Dec. 25, 2018.

* cited by examiner

| CRYSTAL FACE | $2\theta$ (°) |
|---|---|
| 002 | 25.9 TO 26.6 |
| 004 | 53.2 TO 54.7 |
| 110 | AROUND 77.6 |
| 112 | AROUND 83.6 |
| 006 | AROUND 87 |

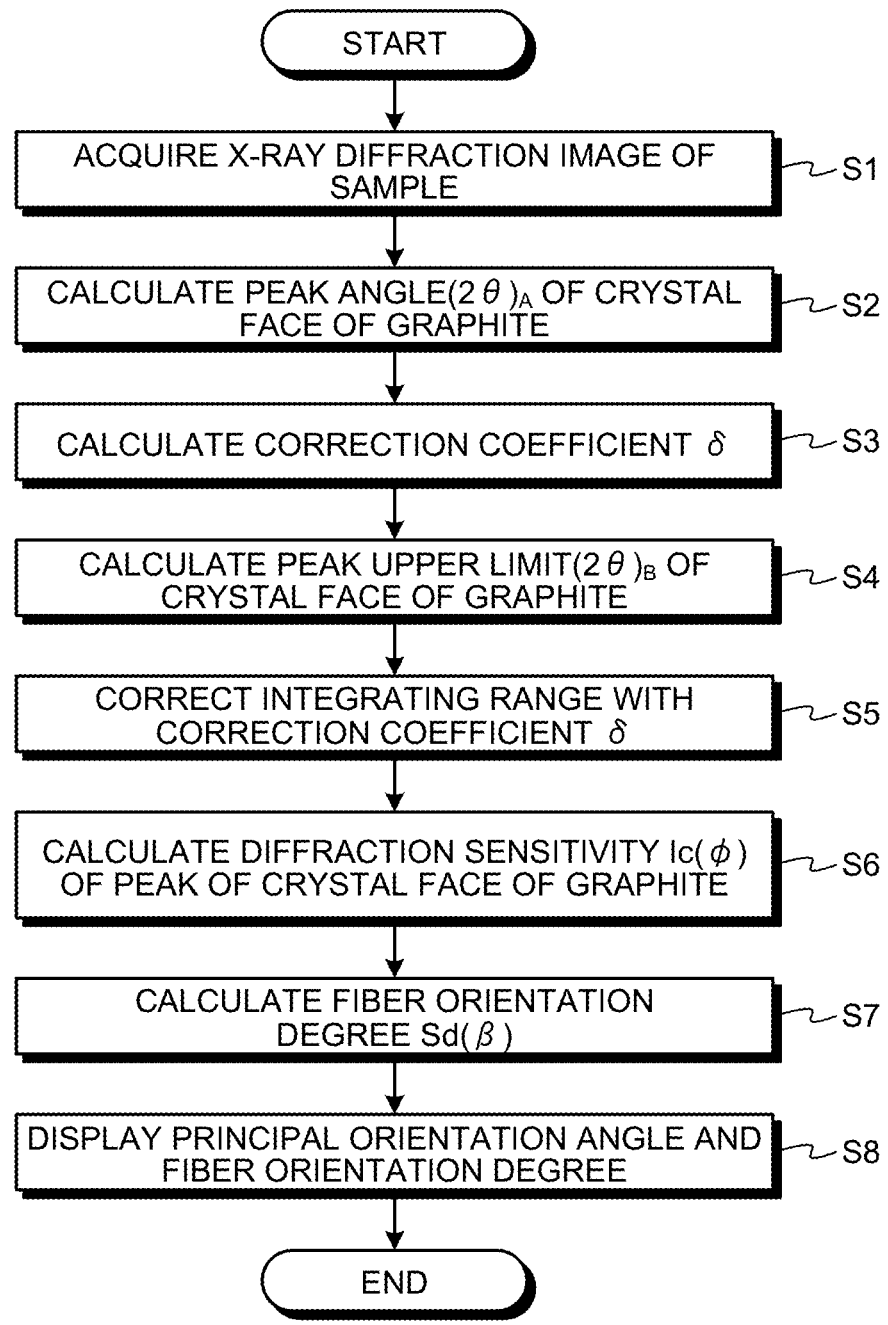

METHOD FOR MEASURING FIBER ORIENTATION DEGREE, FIBER ORIENTATION DEGREE MEASUREMENT APPARATUS, AND CONTROL COMPUTER PROGRAM FOR FIBER ORIENTATION DEGREE MEASUREMENT APPARATUS

FIELD

The present invention relates to a method for measuring a fiber orientation degree of a composite material containing discontinuous carbon fibers, a fiber orientation degree measurement apparatus, and a control program for a fiber orientation degree measurement apparatus.

BACKGROUND

Carbon fiber reinforced plastics (hereinafter, also called "CFRP") with improved strength by blending carbon fibers into plastics are being used for various uses. Information on a fiber orientation degree, that is, a level of presence in each direction at which carbon fibers present in CFRP are present, is important technical information for the properties of CFRP and determination of phenomena during molding.

Examples of known means for measuring information on the distribution of carbon fibers in CFRP include X-ray computer tomography (CT), X-ray transmission imaging, and microscopic observation of polished surfaces; they have problems in that it takes time for pretreatment and measurement apparatuses are expensive.

A method is developed, in which X-ray diffractometry is used, respective X-ray diffraction images are acquired for a sample for which the orientation degree is desired to be measured and a control sample in which carbon fibers are unidirectionally oriented, crystal orientation degrees from pieces of diffraction information of the respective samples are calculated, and a fiber orientation degree of the sample is calculated by removing the influence of a matrix resin in CFRP from a crystal orientation degree of the sample using a crystal orientation degree of the control sample (refer to Patent Literature 1, for example).

CITATION LIST

Patent Literature

Patent Literature 1: Japanese Patent Application Laid-open No. 2016-90259

SUMMARY

Technical Problem

However, in Patent Literature 1, the control sample is required to be prepared, and the orientation degree cannot simply be calculated. The crystal orientation degree calculated in Patent Literature 1 is a two-dimensional (in-plane) crystal orientation degree, in which fiber distribution in a thickness direction of the sample is not considered, and is difficult to use for a sample in which fiber orientation varies in the thickness direction.

The present invention has been made in view of the above, and an object thereof is to provide a method for measuring a fiber orientation degree, a fiber orientation degree measurement apparatus, and a control program for a fiber orientation degree measurement apparatus considering fiber orientation in a thickness direction simply and accurately.

Solution to Problem

To solve the problem described above and to achieve the object, a method for measuring a fiber orientation degree according to the present invention includes: a diffraction image acquisition process of irradiating a sample formed of a composite material containing discontinuous carbon fibers with an X-ray to acquire an X-ray diffraction image; a peak angle calculation process of calculating an angle $(2\theta)_A$ of a peak originating from a crystal face of graphite from an inflection point A of an integral value $I(2\theta)$ obtained by integrating the X-ray diffraction image with respect to an azimuth angle $(\phi)$; a correction coefficient calculation process of calculating a correction coefficient $\delta$ of a thickness of the sample; an upper limit calculation process of calculating an upper limit $(2\theta)_B$ of the peak of the crystal face of graphite from an inflection point B of the integral value $I(2\theta)$; a diffraction sensitivity calculation process of calculating a diffraction sensitivity $I_C(\phi)$ of the peak originating from the crystal face of graphite by correcting an integrating range with the correction coefficient $\delta$ and integrating the X-ray diffraction image with respect to a diffraction angle $(2\theta)$; and an orientation degree calculation process of calculating a fiber orientation degree $Sd(\beta)$ by the method of Hermans from the diffraction sensitivity $I_C(\phi)$.

In the method for measuring a fiber orientation degree according to the present invention, the correction coefficient calculation process includes calculating the correction coefficient $\delta$ by Formula (1) below:

$$\delta = (2\theta)_A - \tan^{-1}\{(1-t/L)\cdot\tan(2\theta)_A\} \quad (1)$$

in Expression (1), t indicates a thickness (mm) of the sample, and L indicates a distance (mm) from an incident plane of the X-ray of the sample to a film surface on which the X-ray diffraction image is projected. As a matter of course, a size of a film that is used for obtain the diffraction image is larger than $L\cdot\tan(2ar_A)$.

In the method for measuring a fiber orientation degree according to the present invention, the diffraction sensitivity calculation process includes setting an angular integrating range to be from $(2\theta)_A-\delta$ to $(2\theta)_A+\delta$ when $(2\theta)_A+\delta > (2\theta)_B$ and setting the angular integrating range to be from $(2\theta)_A-\delta$ to $(2\theta)_B$ when $(2\theta)_A+\delta \leq (2\theta)_B$.

In the method for measuring a fiber orientation degree according to the present invention, the diffraction sensitivity calculated at the diffraction sensitivity calculation process is a sum of diffraction sensitivities of crystal faces [002], [004], and [006] of graphite.

In the method for measuring a fiber orientation degree according to the present invention, the orientation degree calculation process includes calculating the fiber orientation degree $Sd(\beta)$ by Expressions (2), (3), and (4) below:

$$S_0 = \int_{-\pi/2(-90°)}^{+\pi/2(+90°)} I_C(\phi)d\phi \quad (2)$$

$$S_1(\beta) = \int_{-\pi/2(-90°)}^{+\pi/2(+90°)} I_C(\phi)\cdot\cos^2\beta d\phi_0 \quad (3)$$

in Expression 3, $\beta = \phi - \phi_0$.

$$Sd(\beta) = (3\cdot S_1(\beta)/S_0 - 1)/2 \quad (4)$$

A fiber orientation degree measurement apparatus according to the present invention includes: a diffraction image acquisition unit configured to irradiate a sample formed of a composite material containing discontinuous carbon fibers with an X-ray to acquire an X-ray diffraction image; a peak angle calculation unit configured to calculate an angle $(2\theta)_A$ of a peak originating from a crystal face of graphite from an inflection point A of an integral value $I(2\theta)$ obtained by integrating the X-ray diffraction image with respect to an azimuth angle ($\phi$); a correction coefficient calculation unit configured to calculate a correction coefficient $\delta$ of a thickness of the sample; an upper limit calculation unit configured to calculate an upper limit $(2\theta)_B$ of the peak of the crystal face of graphite from an inflection point B of the integral value $I(2\theta)$; a diffraction sensitivity calculation unit configured to calculate a diffraction sensitivity $I_C(\phi)$ of the peak originating from the crystal face of graphite by correcting an integrating range with the correction coefficient $\delta$ and integrating the X-ray diffraction image with respect to a diffraction angle $(2\theta)$; and an orientation degree calculation unit configured to calculate a fiber orientation degree $Sd(\beta)$ by the method of Hermans from the diffraction sensitivity $I_C(\phi)$.

A control program for a fiber orientation degree measurement apparatus according to the present invention executes: a diffraction image acquisition procedure of irradiating a sample formed of a composite material containing discontinuous carbon fibers with an X-ray to acquire an X-ray diffraction image; a peak angle calculation procedure of calculating an angle $(2\theta)_A$ of a peak originating from a crystal face of graphite from an inflection point A of an integral value $I(2\theta)$ obtained by integrating the X-ray diffraction image with respect to an azimuth angle ($\phi$); a correction coefficient calculation procedure of calculating a correction coefficient $\delta$ of a thickness of the sample; an upper limit calculation procedure of calculating an upper limit $(2\theta)_B$ of the peak of the crystal face of graphite from an inflection point B of the integral value $I(2\theta)$; a diffraction sensitivity calculation procedure of calculating a diffraction sensitivity $I_C(\phi)$ of the peak originating from the crystal face of graphite by correcting an integrating range with the correction coefficient $\delta$ and integrating the X-ray diffraction image with respect to a diffraction angle $(2\theta)$; and an orientation degree calculation procedure of calculating a fiber orientation degree $Sd(\beta)$ by the method of Hermans from the diffraction sensitivity $I_C(\phi)$.

Advantageous Effects of Invention

The method for measuring a fiber orientation degree, the fiber orientation degree measurement apparatus, and the control program for a fiber orientation degree measurement apparatus of the present invention do not need to produce a standard sample, also consider fiber orientation in the thickness direction of the sample, and can thus calculate the orientation degree of the carbon fibers in CFRP simply and more accurately.

BRIEF DESCRIPTION OF DRAWINGS

FIG. 13 is a flowchart illustrating measurement of the fiber orientation degree $Sd(\beta)$ according to the embodiment of the present invention.

DESCRIPTION OF EMBODIMENTS

The following describes a method for measuring a fiber orientation degree, a fiber orientation degree measurement apparatus, and a control program for a fiber orientation degree measurement apparatus of the present invention with reference to the accompanying drawings.

Figure 1:
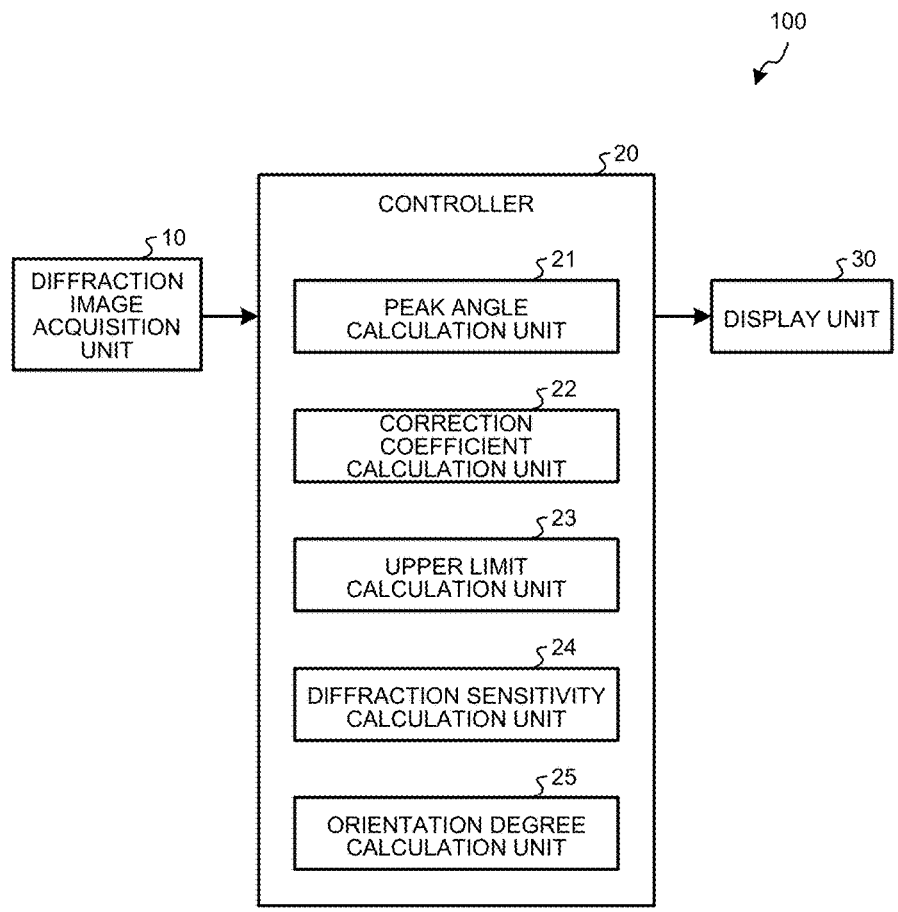
FIG. 1 is a block diagram of a fiber orientation degree measurement apparatus according to an embodiment of the present invention.

FIG. 1 is a block diagram of a fiber orientation degree measurement apparatus 100 according to an embodiment of the present invention. The fiber orientation degree measurement apparatus 100 includes a diffraction image acquisition unit 10, a controller 20 controlling units, and a display unit 30 displaying a measured fiber orientation degree.

The diffraction image acquisition unit 10 irradiates sample formed of a composite material containing discontinuous carbon fibers with an X-ray to acquire an X-ray diffraction image (a Debye ring). With measurement of a fiber orientation degree of the discontinuous carbon fibers in the composite material as an object, and with CFRP mainly containing discontinuous carbon fibers and a matrix resin as a sample, the fiber orientation degree measurement apparatus 100 of the present invention acquires the X-ray diffraction image using a characteristic X-ray such as the Cu-Kα line. The fiber orientation degree measurement apparatus 100 of the present invention is suitable for measurement of an orientation degree of the discontinuous carbon fibers in CFRP and can also be used for measurement of a fiber orientation degree in a mat formed of discontinuous carbon fibers containing no matrix resin. The discontinuous carbon fibers may be any of PAN-based and pitch-based carbon fibers. The matrix resin can be the sample of the present invention when any of a thermosetting resin, a thermoplastic resin, and a resin containing both a thermosetting resin and a thermoplastic resin is used so long as they are resins used for CFRP.

Figure 2:
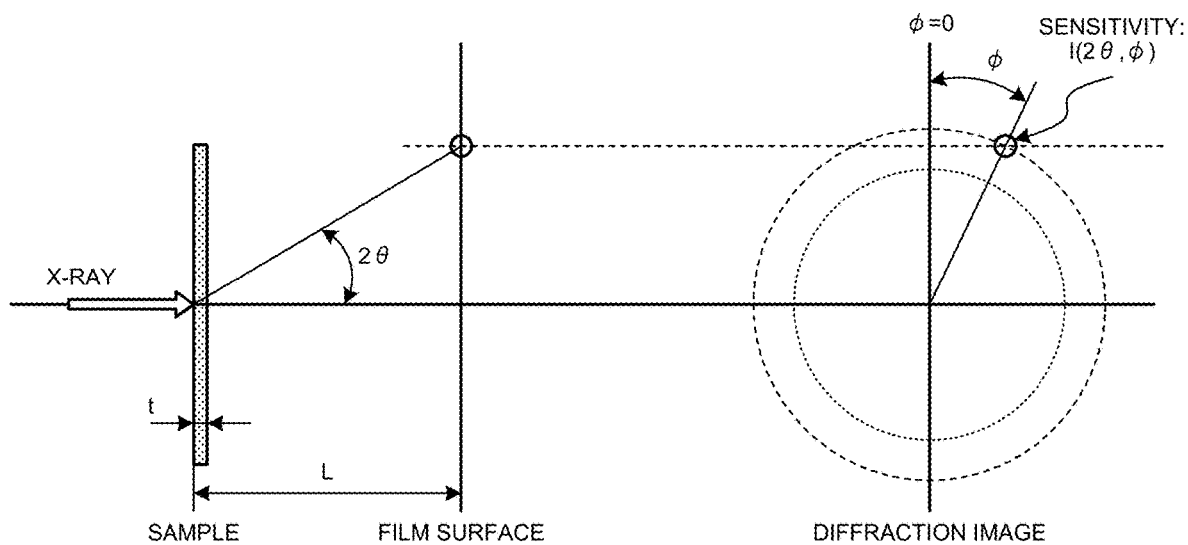
FIG. 2 is a diagram illustrating acquisition of an X-ray diffraction image according to the embodiment of the present invention.
Figure 3:
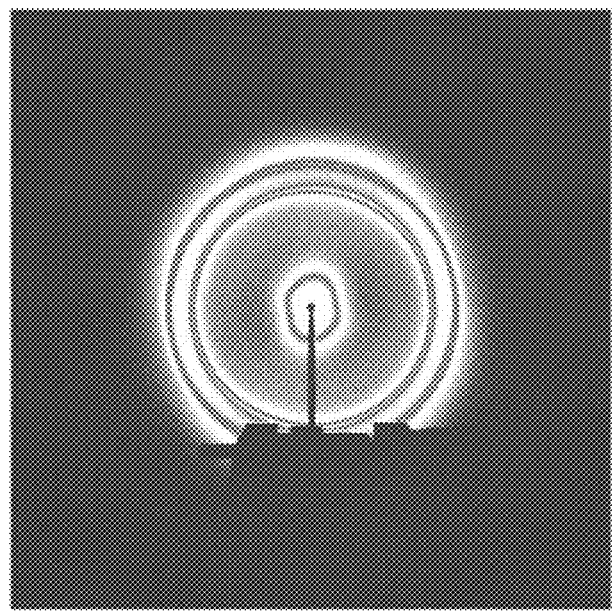
FIG. 3 is a diagram of an exemplary X-ray diffraction image according to the embodiment of the present invention.

As illustrated in FIG. 2, the X-ray diffraction image can be acquired by irradiating the sample with an X-ray and receiving the X-ray reflected on a crystal face of the sample with a film (a camera) or an X-ray detector such as a flat panel detector (FPD). The X-ray diffraction image can be obtained by irradiating the sample (with a width of 5 to 10 mm, a length of 15 to 25 mm, and a thickness of 0.1 to 10 mm) with the characteristic X-ray (the Cu-Kα line) for 10 minutes. FIG. 3 is a diagram of an exemplary X-ray diffraction image according to the embodiment of the present invention. FIG. 3 is an X-ray diffraction image of CFRP containing nylon 6 (polyamide 6) as the matrix resin, in which a double ring (a Debye ring) originating from a polyamide crystal is observed (a shadow projected at the lower part of the X-ray diffraction image is a shadow of an apparatus applying the X-ray).

The controller 20 has a peak angle calculation unit 21, a correction coefficient calculation unit 22, an upper limit calculation unit 23, a diffraction sensitivity calculation unit 24, and an orientation degree calculation unit 25. The controller 20 is implemented by using a central processing unit (CPU) executing various kinds of processing programs, a read only memory (ROM) storing therein the various kinds of processing programs and the like in advance, and a random access memory (RAM) storing therein an arithmetic orientation degree of each processing and the like. As the controller 20, a general-purpose computer such as a work station or a personal computer can be used.

The peak angle calculation unit 21 extracts a diffraction pattern with a certain azimuth angle ($\phi$) from the X-ray diffraction image acquired by the diffraction image acquisition unit 10 and calculates an angle $(2\theta)_A$ of a peak originating from a crystal face of graphite from an inflection point of an integral value of the diffraction pattern.

As illustrated in FIG. 2, the X-ray diffraction image indicates a relation between a diffraction angle ($2\theta$) and a diffraction sensitivity $I(2\theta, \phi)$ of the X-ray reflected on the crystal face of the sample, which is, for example, the polyamide crystal or the crystal face [002], [004], [006], or the like of graphite, and the azimuth angle ($\phi$). The peak angle calculation unit 21 calculates the angle $(2\theta)_A$ of the peak originating from the crystal face of graphite from a diffraction pattern in a direction of the azimuth angle ($\phi$), that is, a diffraction pattern in a circumferential direction from the center of the X-ray diffraction image in the direction of the azimuth angle ($\phi$) The following describes calculation of the angle $(2\theta)_A$ of the peak originating from the crystal face [002], which gives the highest diffraction sensitivity.

Figure 4:
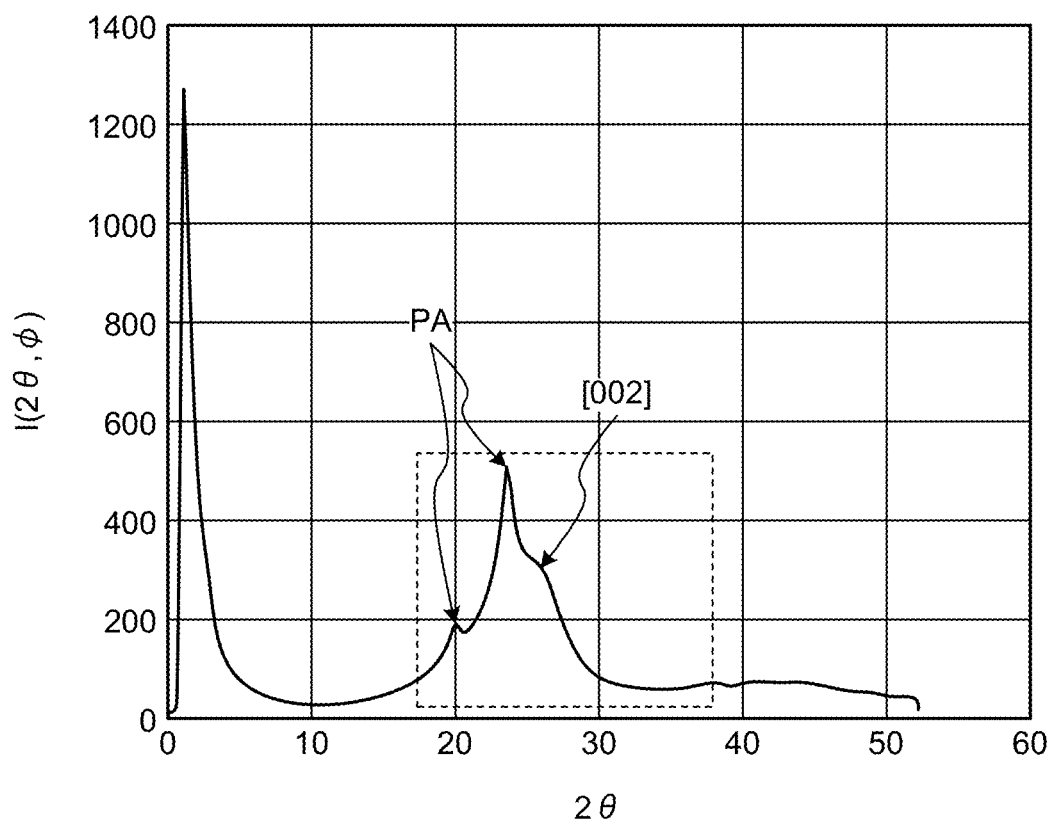
FIG. 4 is a diagram of an exemplary diffraction pattern in an azimuth angle ($\phi$) of the X-ray diffraction image in FIG. 3.

FIG. 4 is a diagram of an exemplary diffraction pattern at the azimuth angle ($\phi$) of the X-ray diffraction image in FIG. 3. In the diffraction pattern in FIG. 4, peaks with a diffraction angle ($2\theta$) of around 20° and 24.5° originate from the polyamide crystal, whereas a peak of a shoulder of the peak of polyamide around 24.5° is a peak originating from the crystal face [002] of graphite.

The peak angle calculation unit 21 integrates the X-ray diffraction image in FIG. 3 in the direction of the azimuth angle ($\phi$) according to Expression (5) below to calculate the angle $(2\theta)_A$ of the peak of the crystal face [002] of graphite from the inflection point.

$$I(2\theta) = \int_{-\pi/2(-90°)}^{+\pi/2(+90°)} I(2\theta, \phi) d\phi \quad (5)$$

In Expression (5), the reason why the integrating range is from $-\pi/2$ ($-90°$) to $+\pi/2$ ($+90°$) is to exclude the influence of a shadow projected on the X-ray diffraction image. When no shadow is projected on the X-ray diffraction image depending on the used apparatus, the X-ray diffraction image may be integrated from $-\pi$ ($-180°$) to $+\pi$ ($+180°$).

Figure 5:
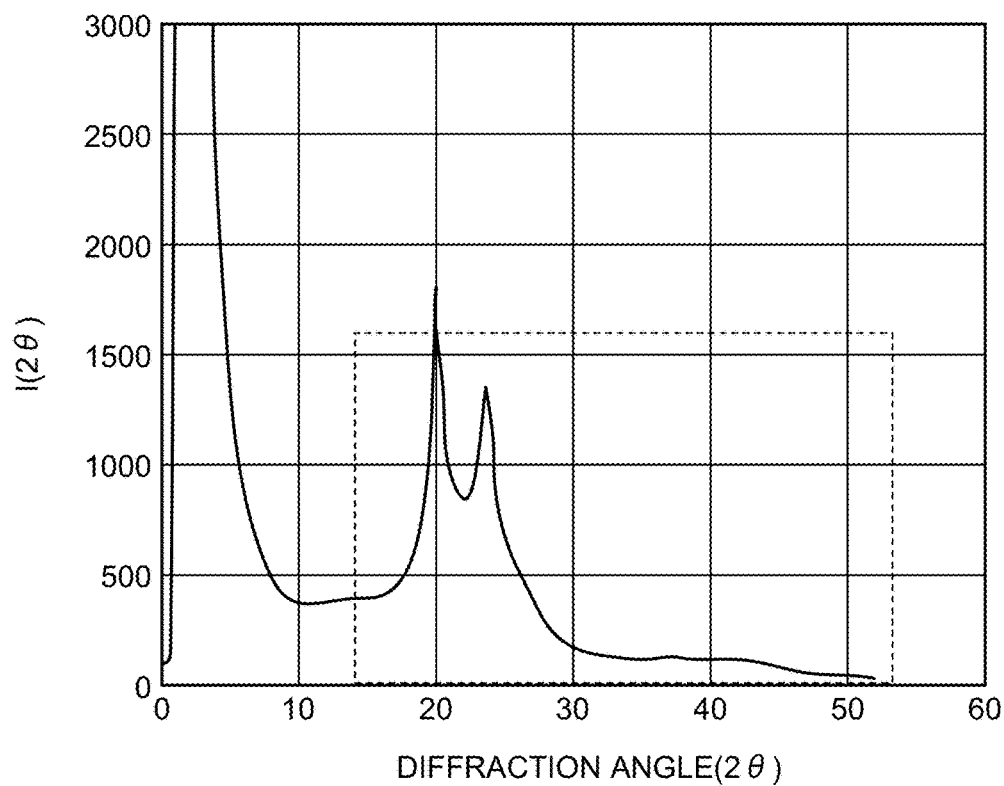
FIG. 5 is a diagram of a relation between an integral value $I(2\theta)$ obtained by integrating the X-ray diffraction image in FIG. 3 with respect to the azimuth angle ($\phi$) and a diffraction angle $(2\theta)$.
Figure 6:
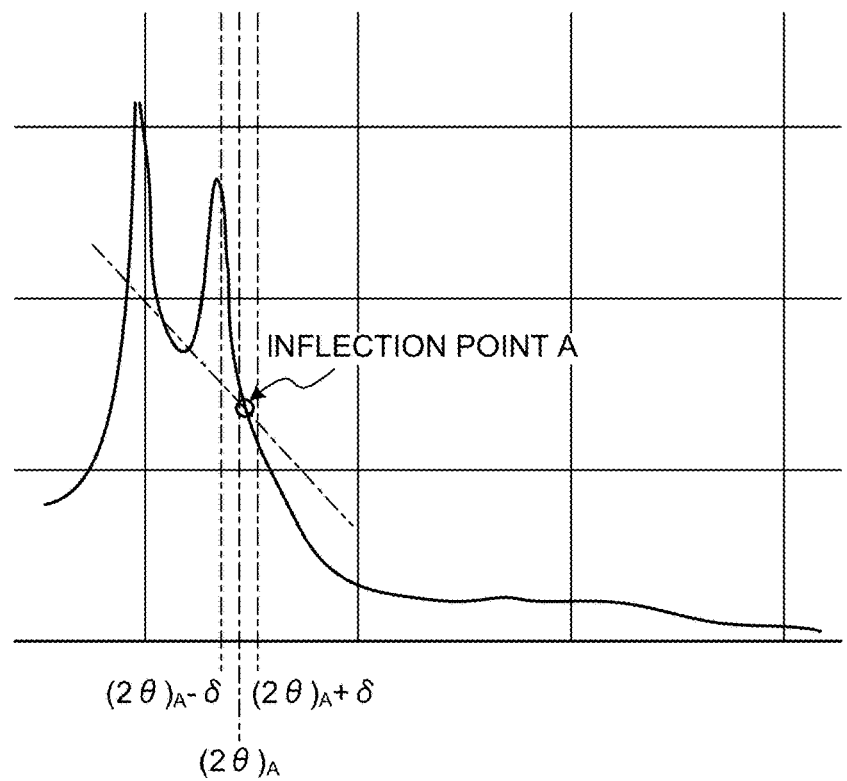
FIG. 6 is an enlarged view of the part indicated by the dotted line in FIG. 5.

FIG. 5 is a diagram of a relation between an integral value $I(2\theta)$ obtained by integrating the X-ray diffraction image in FIG. 3 with respect to the azimuth angle ($\phi$) and the diffraction angle ($2\theta$). FIG. 6 is an enlarged view of the part indicated by the dotted line in FIG. 5 (near the diffraction angle of the crystal face [002] of graphite). An inflection point A appearing near the diffraction angle $2\theta$ of the crystal face [002] of graphite of the integral value $I(2\theta)$ illustrated in FIG. 5 is the angle $(2\theta)_A$ of the peak of the crystal face [002] of graphite.

Figures 7, 8:
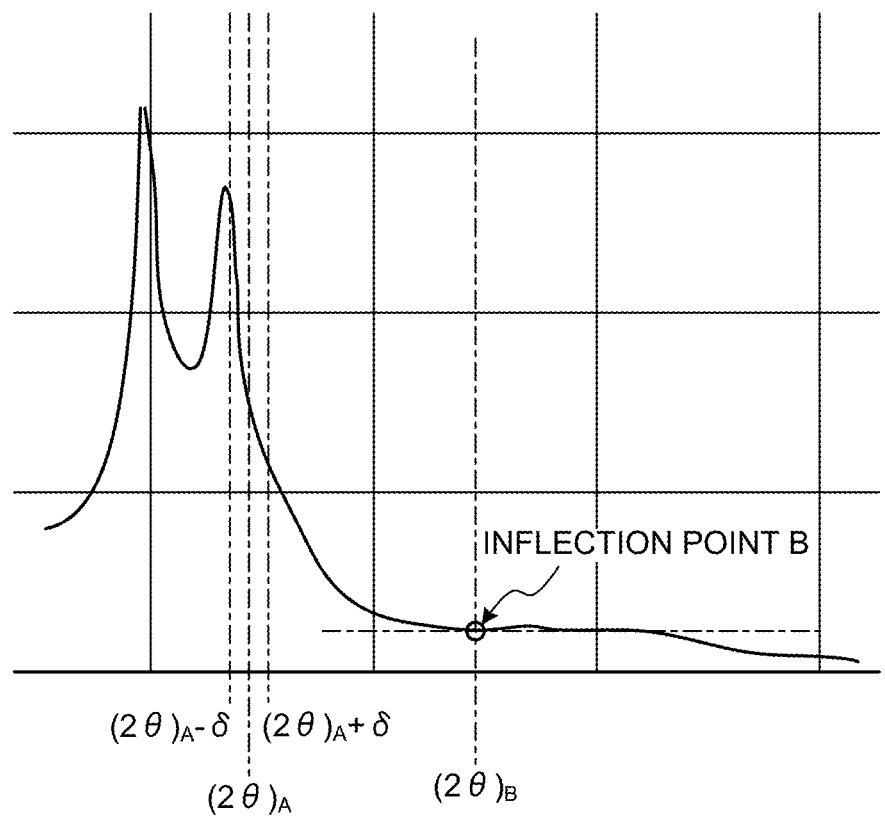
FIG. 7 is a diagram of a relation between a crystal face of graphite and a diffraction angle $(2\theta)$ of its peak.
FIG. 8 is an enlarged view of the part indicated by the dotted line in FIG. 5.

The peak angle $(2\theta)_A$ originating from the [002] face can be determined by referring to the diffraction angle $2\theta$ (25.9 to 26.6°) of the crystal face [002] of general graphite illustrated in FIG. 7 and calculating a differential coefficient from above the diffraction angle $2\theta$ (25.9 to 26.6°) of the crystal face [002]. Although the diffraction angle $2\theta$ of the crystal face of graphite varies by conditions when a graphite crystal is generated, the diffraction angle $2\theta$ of the crystal face [002] of the discontinuous carbon fibers used as the sample is considered to be near the diffraction angle $2\theta$(25.9 to 26.6°) of the crystal face [002] illustrated in FIG. 7, and the inflection point A can be determined by calculating the differential coefficient near the diffraction angle $2\theta$(25.9 to 26.6°) of the crystal face [002].

The correction coefficient calculation unit 22 calculates a correction coefficient $\delta$ of a thickness t (mm) of the sample. The correction coefficient $\delta$ can be calculated by Expression (1) below.

$$\delta = (2\theta)_A - \tan^{-1}\{(1-t/L)\cdot\tan(2\theta)_A\} \quad (1)$$

In Expression (1), t indicates the thickness (mm) of the sample, and L indicates a distance (mm) from an incident plane of the X-ray of the sample to a film surface on which the X-ray diffraction image is projected.

The diffraction angle ($2\theta$) on the horizontal axis of the diffraction pattern in FIG. 4 includes information in a direction of the thickness t of the sample, and the peak angle $(2\theta)_A$ is corrected with the correction coefficient $\delta$. With this correction, a fiber orientation degree with fiber orientation not only in the two-dimensional (in-plane) direction of the sample but also in the thickness direction taken into account can be measured.

The upper limit calculation unit 23 calculates an upper limit $(2\theta)_B$ of the peak originating from the crystal face of graphite from an angle $(2\theta)_B$ of an inflection point B of the integral value $I(2\theta)$ obtained by integrating the X-ray diffraction image with respect to the azimuth angle ($\phi$). The upper limit $(2\theta)_B$ of the peak is an upper limit of an integrating range when the diffraction sensitivity calculation unit 24 described below integrates the diffraction sensitivity $I(2\theta, \phi)$ with respect to the diffraction angle ($2\theta$) to calculate a diffraction sensitivity $I_C(\phi)$ of the peak of the crystal face [002] of graphite.

FIG. 8 is an enlarged view of the part indicated by the dotted line in FIG. 5 (near the angle $(2\theta)_A$ of the peak of the crystal face [002] of graphite). The inflection point B is determined by calculating a differential coefficient upward from the angle $(2\theta)_A$ of the peak of the crystal face [002] of graphite. The angle $(2\theta)_B$ of the next inflection point B above the angle $(2\theta)_A$ of the peak of the crystal face [002] of graphite (the inflection point following the inflection point A; the differential coefficient of the inflection point B is normally zero) is the upper limit of the integrating range when the diffraction sensitivity $I_C(\phi)$ is calculated.

Figure 9:
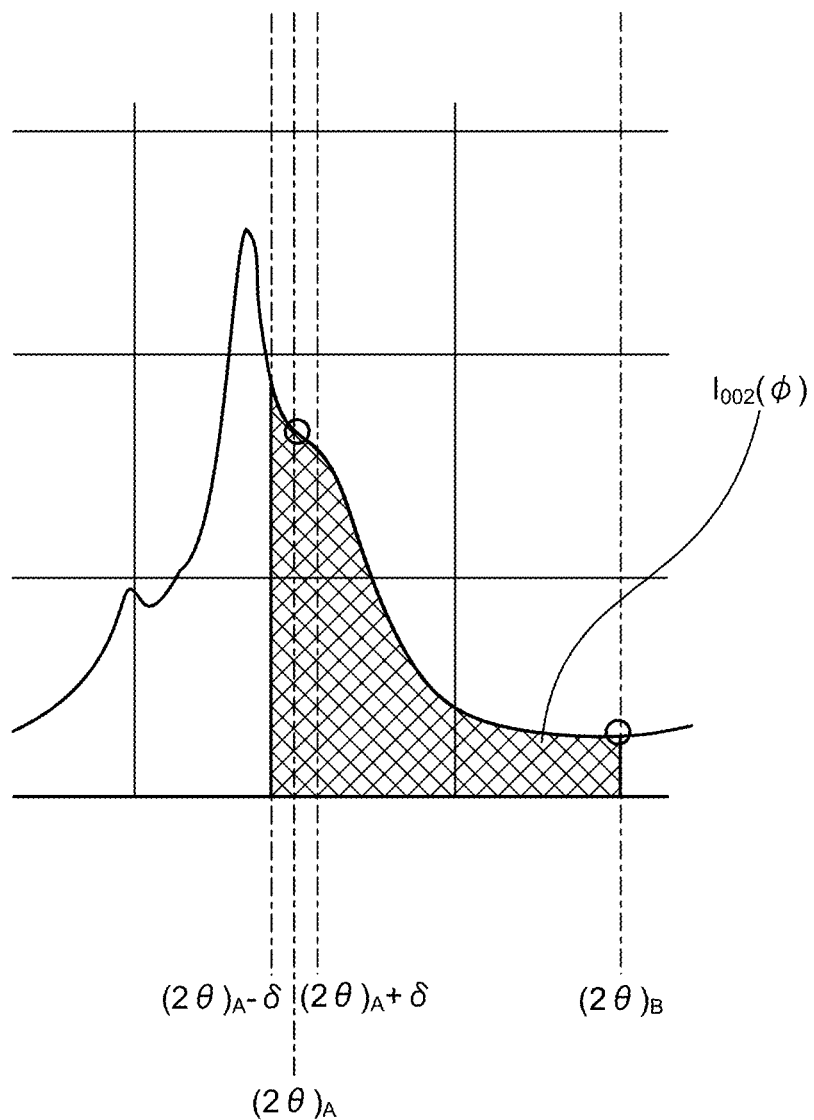
FIG. 9 is an enlarged view of the part indicated by the dotted line in FIG. 4.

The diffraction sensitivity calculation unit 24 calculates the diffraction sensitivity $I_C(\phi)$ of the peak originating from the crystal face of graphite by correcting the integrating range with the correction coefficient $\delta$ calculated by the correction coefficient calculation unit 22 and integrating the X-ray diffraction image with respect to the diffraction angle ($2\theta$). FIG. 9 is an enlarged view of the part indicated by the dotted line in FIG. 4. FIG. 9 illustrates calculation of a diffraction sensitivity $I_{002}(\phi)$ originating from the peak of the crystal face [002] of graphite. In FIG. 9, the shaded part is the diffraction sensitivity $I_{002}(\phi)$; the X-ray diffraction image (diffraction pattern) is integrated to calculate the diffraction sensitivity $I_{002}(\phi)$.

With a value $(2\theta)_A-\delta$ obtained by subtracting the correction coefficient $\delta$ from the angle $(2\theta)_A$ of the peak of the crystal face [002] of graphite as the lower limit of the integrating range and with $(2\theta)_B$ calculated by the upper limit calculation unit 23 as the upper limit, the peak sensitivity $I_{002}(\phi)$ of the crystal face [002] of graphite can be calculated by Expression (6) below.

$$I_{002}(\phi)=\int_{(2\theta)_A-\delta}^{(2\theta)_B} I(2\theta,\phi)d(2\theta) \qquad (6)$$

Depending on the correction coefficient $\delta$, a value $(2\theta)_A+\delta$ obtained by adding the correction coefficient $\delta$ to the angle $(2\theta)_A$ of the peak of the crystal face [002] of graphite may be a value larger than $(2\theta)_B$. In such a case, the peak sensitivity $I_{002}(\phi)$ of the crystal face [002] of graphite may be calculated by Expression (7) below with $(2\theta)_A-\delta$ as the lower limit and with $(2\theta)_A+\delta$ as the upper limit.

$$I_{002}(\phi)=\int_{(2\theta)_A-\delta}^{(2\theta)_A+\delta} I(2\theta,\phi)d(2\theta) \qquad (7)$$

The diffraction image acquisition unit 10 illustrated in FIG. 2 can obtain an X-ray diffraction image containing diffraction at the crystal faces [002], [004], and [006] of graphite, and a diffraction sensitivity $I_{004}(\phi)$ and a diffraction sensitivity $I_{006}(\phi)$ of peaks originating from the crystal faces [004] and [006], respectively, of graphite are calculated in the same manner as the diffraction sensitivity $I_{002}(\phi)$ of the peak of the crystal face [002], and the sum of the diffraction sensitivities of the crystal faces of graphite is calculated as the diffraction sensitivity $I_C(\phi)$ from Expression (8) below.

$$I_C(\phi)=I_{002}(\phi)+I_{004}(\phi)+I_{006}(\phi) \qquad (8)$$

Alternatively, the diffraction sensitivity $I_{002}(\phi)$ at the crystal face [002] of graphite is the largest, and the diffraction sensitivity $I_{002}(\phi)$ may be regarded as the diffraction sensitivity $I_C(\phi)$.

Figure 10:
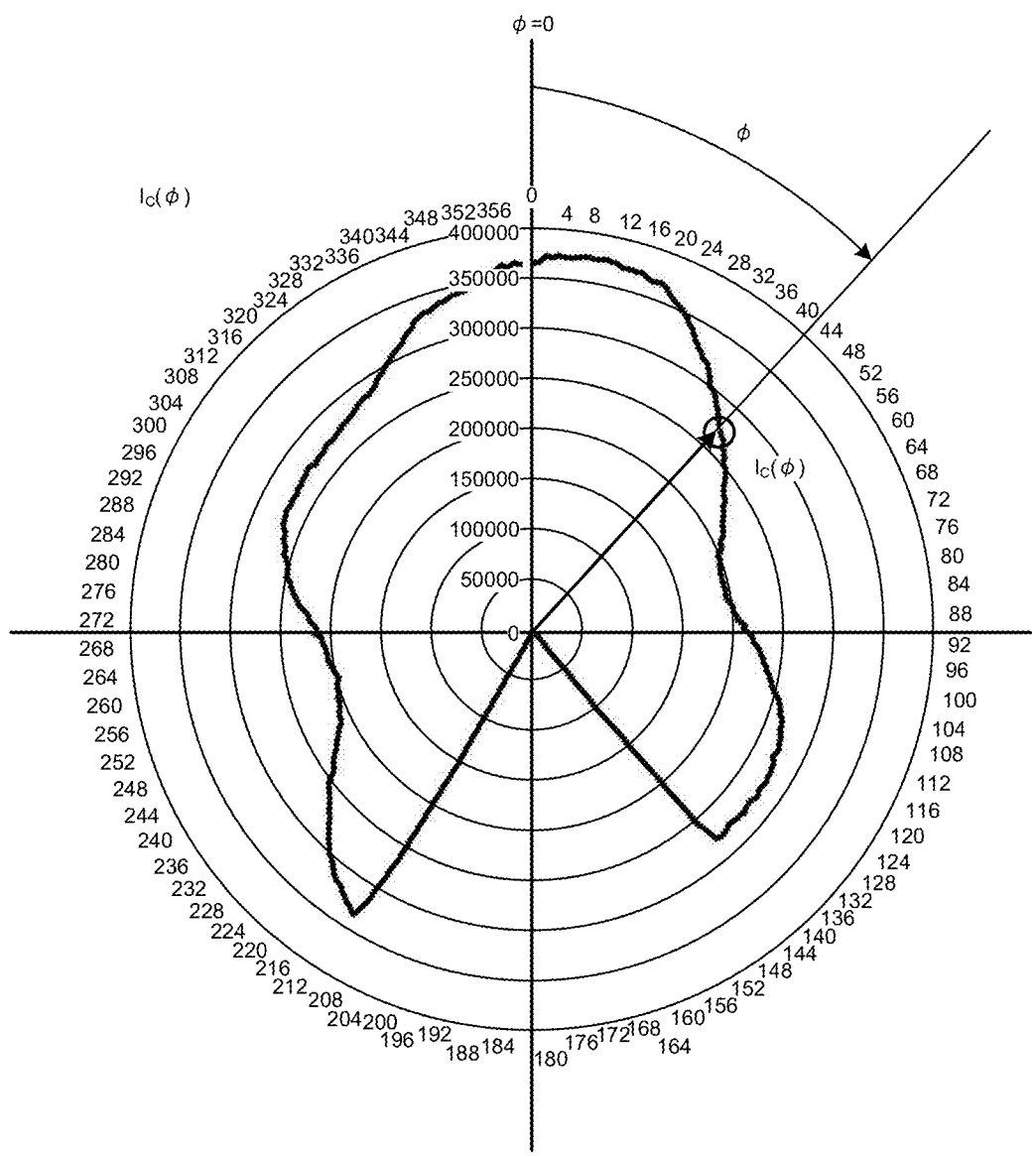
FIG. 10 is a diagram of a relation between the azimuth angle ($\phi$) and a diffraction sensitivity $I_C(\phi)$ originating from the peak of the crystal face of graphite.

The orientation degree calculation unit 25 calculates the fiber orientation degree $Sd(\beta)$ by the method of Hermans from the diffraction sensitivity $I_C(\phi)$. FIG. 10 is a diagram of a relation between the azimuth angle ($\phi$) and the diffraction sensitivity $I_C(\phi)$ originating from the peak of the crystal face of graphite, in which the diffraction sensitivity $I_C(\phi)$ with an azimuth angle ($\phi$) of $\phi=1$ to $360°$ is illustrated (for $\phi=140$ to $212°$, the diffraction sensitivity $I_C(\phi)$ is not calculated under the influence of the shadow of the apparatus).

Figure 11:
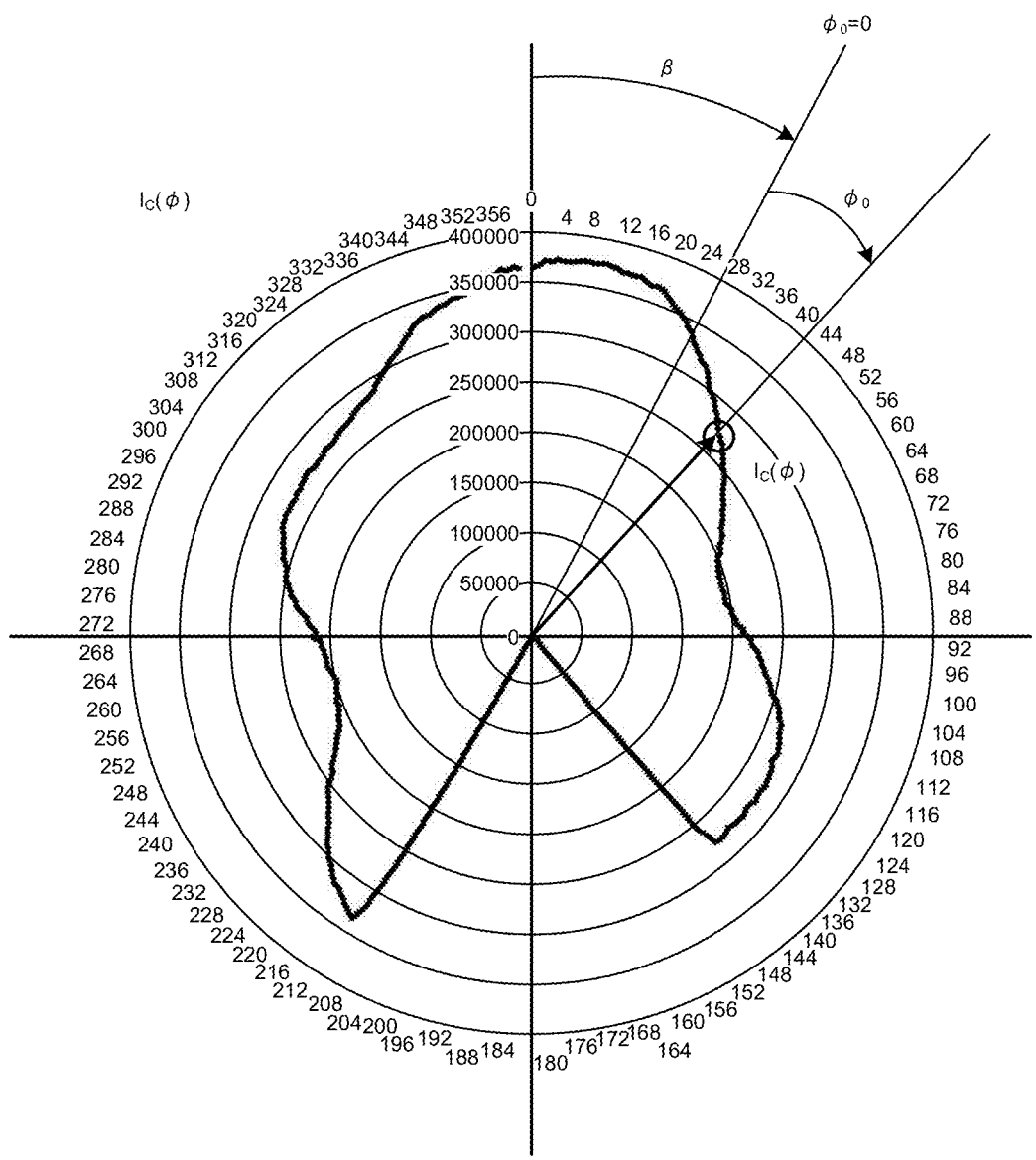
FIG. 11 is a diagram illustrating calculation of a fiber orientation degree $Sd(\beta)$ from FIG. 10.

The fiber orientation degree $Sd(\beta)$ is an indicator indicating a level of presence in each direction at which the discontinuous carbon fibers are oriented within the sample and is calculated using Expressions (2), (3), and (4) below by the method of Hermans in the present invention. FIG. 11 is a diagram illustrating calculation of the fiber orientation degree $Sd(\beta)$ from FIG. 10.

$$S_0=\int_{-\pi/2(-90°)}^{+\pi/2(+90°)} I_C(\phi)d\phi \qquad (2)$$

$$S_1(\beta)=\int_{-\pi/2(-90°)}^{+\pi/2(+90°)} I_C(\phi)\cdot\cos^2\beta d\phi_0 \qquad (3)$$

In Expression (3), $\beta=\phi-\phi_0$.

$$Sd(\beta)=(3\cdot S_1(\beta)/S_0-1)/2 \qquad (4)$$

As shown in Expression (9) below, a maximum value $Sd_0$ of $Sd(\beta)$ determined by Expression (4) is a fiber orientation degree $Sd_0$ of the sample.

$$Sd_0=\max\cdot Sd(\beta) \qquad (9)$$

As shown in Expression (10) below, $\beta$ when $Sd(\beta)$ is the maximum value $Sd_0$ is $\beta_0$.

$$\beta_0=\beta|\max\cdot Sd(\beta) \qquad (10)$$

The crystal faces [002] and the like of graphite deviate from the direction of a principal axis of the carbon fibers by 90°, and a principal orientation angle $\alpha_0$ of the discontinuous carbon fibers is as Expression (11) below.

$$\alpha_0=\beta_0\pm\pi/2 \qquad (11)$$

Figure 12:
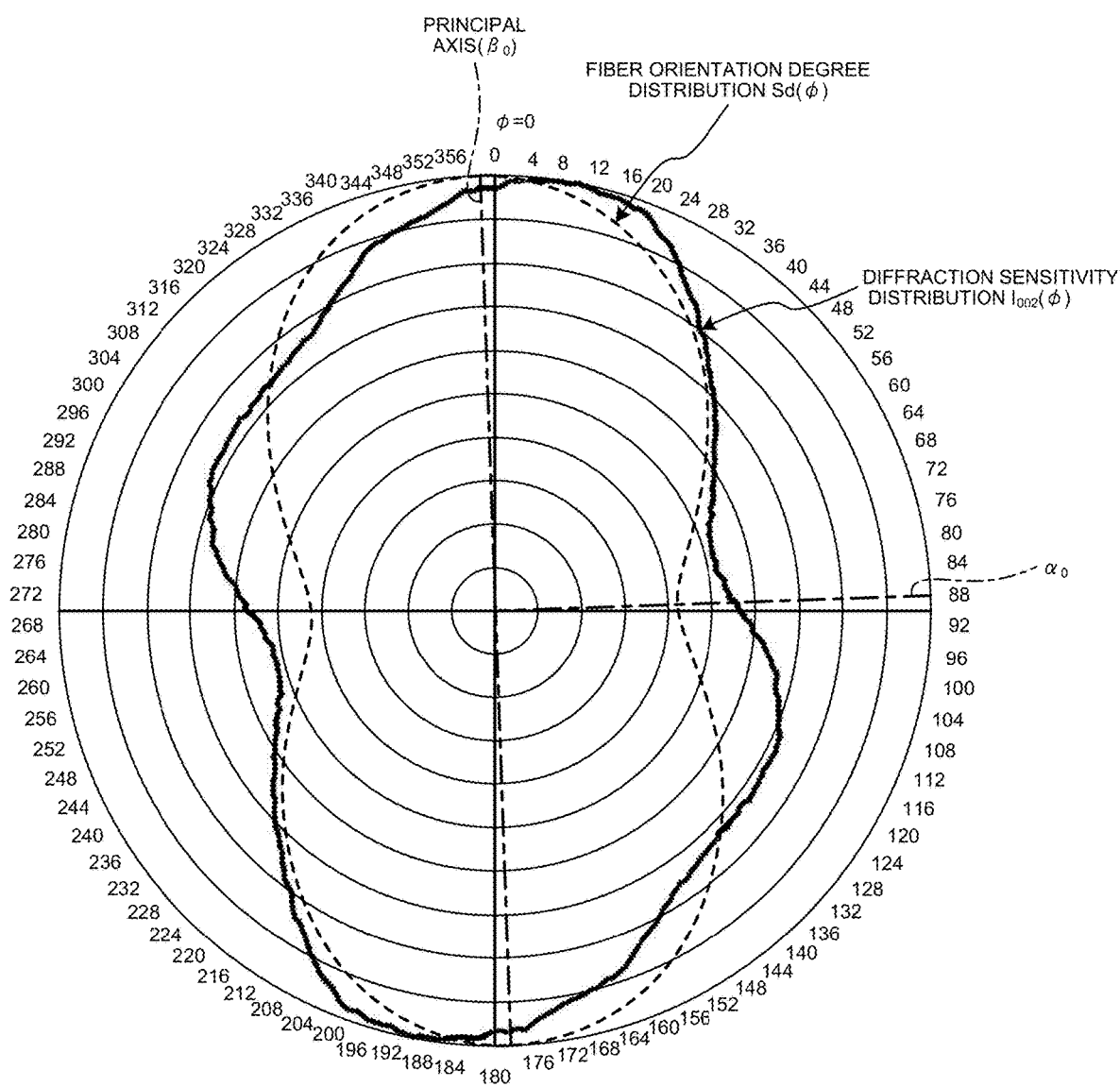
FIG. 12 is a diagram of a relation between the azimuth angle ($\phi$) and the fiber orientation degree $Sd(\beta)$.

FIG. 12 is a diagram of a relation between the azimuth angle ($\phi$) and the fiber orientation degree $Sd(\beta)$. The fiber orientation degree $Sd(\beta)$ is illustrated together with the diffraction sensitivity $I_{002}(\phi)$, in which the data of the fiber orientation degree $Sd(\beta)$ and the diffraction sensitivity $I_{002}(\phi)$ in $\phi=90$ to $270°$ is illustrated as rotational symmetry of the data in 0 to 90° and 270 to 360° for the sake of simplicity. It can be seen from the fiber orientation degree $Sd(\beta)$ in FIG. 12 that the maximum value $Sd_0$ is given by $\beta_0=358°$, whereas the principal orientation angle $\alpha_0$ is 88°.

The fiber orientation degree $Sd(\beta)$ of the discontinuous carbon fibers in the sample is measured by the process of a flowchart illustrated in FIG. 13.

First, the diffraction image acquisition unit 10 acquires an X-ray diffraction image of the sample (Step S1), and the peak angle calculation unit 21 calculates the angle $(2\theta)_A$ of the peak originating from the crystal face of graphite from the inflection point A of the integral value $I(2\theta)$ obtained by integrating the X-ray diffraction image with respect to the azimuth angle ($\phi$) (Step S2). The crystal face of graphite for which the angle $(2\theta)_A$ is calculated may be [002], [004], and [006] or only [002].

Subsequently, the correction coefficient calculation unit 22 calculates the correction coefficient $\delta$ of the thickness of the sample (Step S3). The correction coefficient $\delta$ may be calculated from Expression (2).

Subsequently, the upper limit calculation unit 23 calculates the upper limit $(2\theta)_B$ of the peak of the crystal face of graphite from the inflection point B of the integral value $I(2\theta)$ obtained by integrating the X-ray diffraction image with respect to the azimuth angle ($\phi$) (Step S4). The inflection point B is a next inflection point above the angle $(2\theta)_A$ of the peak originating from the crystal face of graphite.

After the upper limit $(2\theta)_B$ of the peak is calculated (Step S4), the diffraction sensitivity calculation unit 24 corrects the integrating range with the correction coefficient $\delta$ calculated at Step S3 (Step S5) and integrates the X-ray diffraction image with the integrating range calculated at Step S5 to calculate the diffraction sensitivity $I_C(\phi)$ of the peak originating from the crystal face of graphite (Step S6). The integrating range is from $(2\theta)_A-\delta$ to $(2\theta)_B$ when $(2\theta)_B\geq(2\theta)_A+\delta$ and from $(2\theta)_A-\delta$ to $(2\theta)_B$ when $(2\theta)_B<(2\theta)_A+\delta$.

After the diffraction sensitivity $I_C(\phi)$ is calculated (Step S6), the orientation degree calculation unit 25 calculates the fiber orientation degree $Sd(\beta)$ by the method of Hermans from the diffraction sensitivity $I_C(\phi)$ (Step S7). The orientation degree calculation unit 25 outputs the maximum value $Sd_0$ of the fiber orientation degree $Sd(\beta)$ and the principal orientation angle $\alpha_0$ to the controller 20.

The controller 20 performs control to display the maximum value $Sd_0$ of the fiber orientation degree $Sd(\beta)$ and the principal orientation angle $\alpha_0$ on the display unit 30 (Step S8).

The present invention uses Expression (8) so that fiber orientation not only in the in-plane direction of the sample but also in the direction of the thickness t is taken into account for calculation of the fiber orientation degree $Sd(\beta)$. With this consideration, the fiber orientation degree $Sd(\beta)$ of a sample in which fiber orientation varies in the direction of the thickness t can be measured more accurately.

REFERENCE SIGNS LIST

10 Diffraction image acquisition unit
20 Controller
21 Peak angle calculation unit
22 Correction coefficient calculation unit
23 Upper limit calculation unit
24 Diffraction sensitivity calculation unit
25 Orientation degree calculation unit
30 Display unit
100 Fiber orientation degree measurement apparatus

The invention claimed is:

1. A method for measuring a fiber orientation degree comprising:
a diffraction image acquisition process of irradiating a sample formed of a composite material containing discontinuous carbon fibers with an X-ray to acquire an X-ray diffraction image;
a peak angle calculation process of calculating an angle $(2\theta)_A$ of a peak originating from a crystal face of graphite from an inflection point A of an integral value $I(2\theta)$ obtained by integrating the X-ray diffraction image with respect to an azimuth angle ($\phi$);
a correction coefficient calculation process of calculating a correction coefficient $\delta$ of a thickness of the sample;
an upper limit calculation process of calculating an upper limit $(2\theta)_B$ of the peak of the crystal face of graphite from an inflection point B of the integral value $I(2\theta)$;
a diffraction sensitivity calculation process of calculating a diffraction sensitivity $I_C(\phi)$ of the peak originating from the crystal face of graphite by correcting an integrating range with the correction coefficient $\delta$ and integrating the X-ray diffraction image with respect to a diffraction angle $(2\theta)$; and
an orientation degree calculation process of calculating a fiber orientation degree $Sd(\beta)$ by the method of Hermans from the diffraction sensitivity $I_C(\phi)$,
wherein the correction coefficient calculation process includes calculating the correction coefficient $\delta$ by Formula (1) below:

$$\delta=(2\theta)_A-\tan^{-1}\{(1-t/L)\cdot\tan(2\theta)_A\} \quad (1)$$

in Expression (1), t indicates a thickness (mm) of the sample, and L indicates a distance (mm) from an incident plane of the X-ray of the sample to a film surface on which the X-ray diffraction image is projected.

2. The method for measuring a fiber orientation degree according to claim 1, wherein the diffraction sensitivity calculation process includes setting an angular integrating range to be from $(2\theta)_A-\delta$ to $(2\theta)_A+\delta$ when $(2\theta)_A+\delta>(2\theta)_B$ and setting the angular integrating range to be from $(2\theta)_A-\delta$ to $(2\theta)_B$ when $(2\theta)_A+\delta\leq(2\theta)_B$.

3. The method for measuring a fiber orientation degree according to claim 1, wherein the diffraction sensitivity calculated at the diffraction sensitivity calculation process is a sum of diffraction sensitivities of crystal faces [002], [004], and [006] of graphite.

4. The method for measuring a fiber orientation degree according to claim 1, wherein the orientation degree calculation process includes calculating the fiber orientation degree $Sd(\beta)$ by Expressions (2), (3), and (4) below:

$$S_0=\int_{-\pi/2(-90°)}^{+\pi/2(+90°)} I_C(\phi)d\phi \quad (2)$$

$$S_1(\beta)=\int_{-\pi/2(-90°)}^{+\pi/2(+90°)} I_C(\phi)\cdot\cos^2\beta\, d\phi_0 \quad (3)$$

in Expression 3, $\beta=\phi-\phi_0$, $$Sd(\beta)=(3\cdot S_1(\beta)/S_0-1)/2 \quad (4).$$

5. A fiber orientation degree measurement apparatus comprising:
an X-ray diffraction imaging system including an X-ray irradiator configured to irradiate a sample formed of a composite material containing discontinuous carbon fibers with an X-ray to acquire an X-ray diffraction image; and
a CPU programmed to function as:
a peak angle calculation unit configured to calculate an angle $(2\theta)_A$ of a peak originating from a crystal face of graphite from an inflection point A of an integral value $I(2\theta)$ obtained by integrating the X-ray diffraction image with respect to an azimuth angle ($\phi$);
a correction coefficient calculation unit configured to calculate a correction coefficient $\delta$ of a thickness of the sample;
an upper limit calculation unit configured to calculate an upper limit $(2\theta)_B$ of the peak of the crystal face of graphite from an inflection point B of the integral value $I(2\theta)$;
a diffraction sensitivity calculation unit configured to calculate a diffraction sensitivity $I_C(\phi)$ of the peak originating from the crystal face of graphite by correcting an integrating range with the correction coefficient $\delta$ and integrating the X-ray diffraction image with respect to a diffraction angle $(2\theta)$; and
an orientation degree calculation unit configured to calculate a fiber orientation degree $Sd(\beta)$ by the method of Hermans from the diffraction sensitivity $I_C(\phi)$,
wherein the CPU is further configured to calculate the correction coefficient $\delta$ by Formula (1) below:

$$\delta=(2\theta)_A-\tan^{-1}\{(1-t/L)\cdot\tan(2\theta)_A\} \quad (1)$$

in Expression (1), t indicates a thickness (mm) of the sample, and L indicates a distance (mm) from an incident plane of the X-ray of the sample to a film surface on which the X-ray diffraction image is projected.

6. A non-transitory computer-readable recording medium with an executable program stored thereon, the program being a control program for a fiber orientation degree measurement apparatus executing:
a diffraction image acquisition procedure of irradiating a sample formed of a composite material containing discontinuous carbon fibers with an X-ray to acquire an X-ray diffraction image;
a peak angle calculation procedure of calculating an angle $(2\theta)_A$ of a peak originating from a crystal face of graphite from an inflection point A of an integral value $I(2\theta)$ obtained by integrating the X-ray diffraction image with respect to an azimuth angle ($\phi$);
a correction coefficient calculation procedure of calculating a correction coefficient $\delta$ of a thickness of the sample;
an upper limit calculation procedure of calculating an upper limit $(2\theta)_B$ of the peak of the crystal face of graphite from an inflection point B of the integral value $I(2\theta)$;
a diffraction sensitivity calculation procedure of calculating a diffraction sensitivity $I_C(\phi)$ of the peak originating from the crystal face of graphite by correcting an integrating range with the correction coefficient $\delta$ and integrating the X-ray diffraction image with respect to a diffraction angle $(2\theta)$; and an orientation degree calculation procedure of calculating a fiber orientation degree $Sd(\beta)$ by the method of Hermans from the diffraction sensitivity $I_C(\phi)$, wherein the correction coefficient calculation procedure includes calculating the correction coefficient $\delta$ by Formula (1) below:

$$\delta = (2\theta)_A - \tan^{-1}\{(1-t/L)\cdot\tan(2\theta)_A\} \quad (1)$$

in Expression (1), t indicates a thickness (mm) of the sample, and L indicates a distance (mm) from an incident plane of the X-ray of the sample to a film surface on which the X-ray diffraction image is projected.

\* \* \* \* \*